(12) United States Patent
Dolfini

(10) Patent No.: US 12,196,239 B2
(45) Date of Patent: Jan. 14, 2025

(54) CLAMP HAVING A LOCK AND A RELEASE RESISTING KEY

(71) Applicant: Koch-Glitsch, LP, Wichita, KS (US)

(72) Inventor: Danilo Dolfini, Rome (IT)

(73) Assignee: Koch-Glitsch, LP, Wichita, KS (US)

(*) Notice: Subject to any disclaimer, the term of this patent is extended or adjusted under 35 U.S.C. 154(b) by 0 days.

(21) Appl. No.: 18/220,847

(22) Filed: Jul. 12, 2023

(65) Prior Publication Data

US 2023/0392623 A1 Dec. 7, 2023

Related U.S. Application Data

(63) Continuation of application No. 17/836,654, filed on Jun. 9, 2022, now Pat. No. 11,739,776.

(60) Provisional application No. 63/349,866, filed on Jun. 7, 2022.

(51) Int. Cl.
*F16B 2/06* (2006.01)
*F16B 19/10* (2006.01)

(52) U.S. Cl.
CPC ............ *F16B 2/06* (2013.01); *F16B 19/1081* (2013.01)

(58) Field of Classification Search
CPC ...... F16B 5/0076; F16B 5/0084; F16B 5/065; F16B 19/1081; F16B 21/06; F16B 21/065; F16B 21/07; F16B 21/073; F16B 21/075; F16B 21/076; Y10T 403/75
USPC .................................................. 403/DIG. 11
See application file for complete search history.

(56) References Cited

U.S. PATENT DOCUMENTS

| | | | |
|---|---|---|---|
| 3,074,134 A * | 1/1963 | Buechler | F16B 5/128 52/716.7 |
| 3,210,820 A | 10/1965 | Humiston | |
| 4,176,428 A | 12/1979 | Kimura | |
| 4,405,272 A | 9/1983 | Wollar | |
| 4,409,707 A | 10/1983 | Muraishi et al. | |
| 4,452,020 A | 6/1984 | Werner | |
| 4,531,697 A * | 7/1985 | Steiner | G09F 3/08 248/222.13 |

(Continued)

FOREIGN PATENT DOCUMENTS

| | | |
|---|---|---|
| GB | 989967 A | 4/1965 |
| JP | H0814231 A | 1/1996 |
| JP | 3491266 B2 | 1/2004 |

OTHER PUBLICATIONS

Final Rejection received for U.S. Appl. No. 17/836,654, mailed on Feb. 7, 2023, 21 pages.

(Continued)

*Primary Examiner* — Matthew R McMahon

(57) ABSTRACT

A clamp includes a lock and a key. The lock defines a first longitudinal axis, and the key defines a second longitudinal axis. The lock has a clamping body portion, a pair of opposing snap lock arms, and an annular shaped receptacle. Each snap lock arm has a mounting end integrally joined to the clamping body portion. Each snap lock arm is flexible about its mounting end. The annular shaped receptacle is defined by the pair of opposing snap lock arms, being disposed between the pair of opposing snap lock arms adjacent to the mounting ends. The key includes a wedge body portion and a deformable elastic annular head portion. The annular head portion releasably retains the key in the lock. The annular head portion is sized to engageably cooperate with the annular shaped receptacle to provide the releasable retention.

22 Claims, 9 Drawing Sheets

(56) References Cited

U.S. PATENT DOCUMENTS

| | | | |
|---|---|---|---|
| 4,668,145 A | | 5/1987 | Hirohata |
| 4,878,791 A | | 11/1989 | Kurihara et al. |
| 4,921,371 A | | 5/1990 | Boiraeu et al. |
| 5,241,451 A | | 8/1993 | Walburn et al. |
| 5,458,365 A | | 10/1995 | Rogers et al. |
| 5,540,528 A | | 7/1996 | Schmidt et al. |
| 5,580,204 A | | 12/1996 | Hultman |
| 5,775,860 A | | 7/1998 | Meyer |
| 5,881,982 A | * | 3/1999 | Hollingsworth .... F16B 19/1081 248/222.12 |
| 6,394,695 B1 | * | 5/2002 | Chausset ................ F16B 5/065 403/397 |
| 8,677,573 B2 | | 3/2014 | Lee |
| 9,945,483 B2 | | 4/2018 | Benner et al. |
| 11,277,927 B2 | | 3/2022 | Balana Avila et al. |
| 11,629,740 B2 | * | 4/2023 | Cai .......................... F16B 2/14 403/282 |
| 11,680,593 B2 | * | 6/2023 | Muecke ................ F16B 21/076 403/323 |
| 11,697,555 B2 | * | 7/2023 | Grävingholt .......... F16B 21/075 198/618 |
| 2007/0031185 A1 | | 2/2007 | Bertram et al. |
| 2018/0334838 A1 | | 11/2018 | Chang et al. |
| 2021/0403241 A1 | * | 12/2021 | Grävingholt ........... B65G 21/06 |

OTHER PUBLICATIONS

Non-Final Rejection received for U.S. Appl. No. 17/836,654, mailed on Nov. 8, 2022, 22 pages.

* cited by examiner

CLAMP HAVING A LOCK AND A RELEASE RESISTING KEY

RELATED APPLICATIONS

This application claims priority as a continuation application to U.S. patent application Ser. No. 17/836,654, filed on Jun. 9, 2022, which claims the benefit of, and priority to U.S. Provisional Patent Application No. 63/349,866, filed on Jun. 7, 2022, the contents of each of which are incorporated herein by reference in their entirety.

BACKGROUND

The present invention relates generally to clamps, and more particularly, to a clamp for joining polymeric components, such as various types of mass transfer column structures, where the clamp includes a release preventing component.

Conventional mass transfer columns, including heat exchange columns, typically include an upright shell and a plurality of mass transfer structures and/or mist eliminator structures that are positioned within the shell. The mass transfer structures are used to facilitate mass or heat transfer between fluid streams flowing within the column and may include various types of trays, liquid collectors and distributors, support grids, and structured and random packings. The mist eliminators are used to remove aerosols from vapor streams. The fluid streams are normally one or more downwardly flowing liquid streams and one or more ascending vapor streams, although other combinations of fluid streams are possible. A plurality of such mass transfer structures and/or mist eliminators are normally supported in vertically spaced relationship by support rings that are welded to the inner surface of the shell and underlie the outer peripheral edge portion of the trays.

At least some known mass transfer structures and/or mist eliminator structures require welding of several polymeric members together within the interior of the mass transfer column. Welding of the polymeric members can be both difficult and dangerous and may weaken the structural integrity of the polymeric members as a result of changes in the polymer chains during the welding process.

BRIEF DESCRIPTION

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a clamp is provided. The clamp includes a lock defining a first longitudinal axis. The lock includes a clamping body portion, a pair of opposing snap lock arms, and an annular shaped receptacle defined by the pair of opposing snap lock arms. Each snap lock arm has a mounting end integrally joined to the clamping body portion. In addition, each snap lock arm is flexible about its mounting end. The annular shaped receptacle is disposed between the pair of opposing snap lock arms adjacent to the mounting ends thereof. The clamp also includes a key defining a second longitudinal axis. The key includes a wedge body portion and a deformable elastic annular head portion. The deformable elastic annular head portion releasably retains the key in the lock. Furthermore, the deformable elastic annular head portion is sized to engageably cooperate with the annular shaped receptacle to provide the releasable retention.

In another aspect, at least the key of the clamp described above is made of a synthetic polymer material.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSED EMBODIMENTS

The following detailed description of embodiments of the disclosure references the accompanying figures. The embodiments are intended to describe aspects of the disclosure in sufficient detail to enable those with ordinary skill in the art to practice the disclosure. The embodiments of the disclosure are illustrated by way of example and not by way of limitation. Other embodiments may be utilized, and changes may be made without departing from the scope of the claims. The following description is, therefore, not limiting. The scope of the present disclosure is defined only by the appended claims, along with the full scope of equivalents to which such claims are entitled.

Broadly, aspects of the invention are directed to a clamp for releasably coupling two or more members together in a secure manner. The clamp includes a lock that includes a clamp body with a pair of snap lock arms. The clamp body and the snap lock arms provide the clamping structure for coupling two or more members together in a quick and easy manner. The lock also includes a generally circular or annular shaped receptacle disposed between the pair of snap lock arms. The annular shaped receptacle is configured to receive at least a portion of a key therein. The key functions as a release preventing component that secures the lock into a rigid, locking position, such that the lock is prevented from being removed and the two or more members are securely locked together. Embodiments of the invention are shown in FIGS. 1-13, but the present invention is not limited to the illustrated structures or applications.

Figure 1:
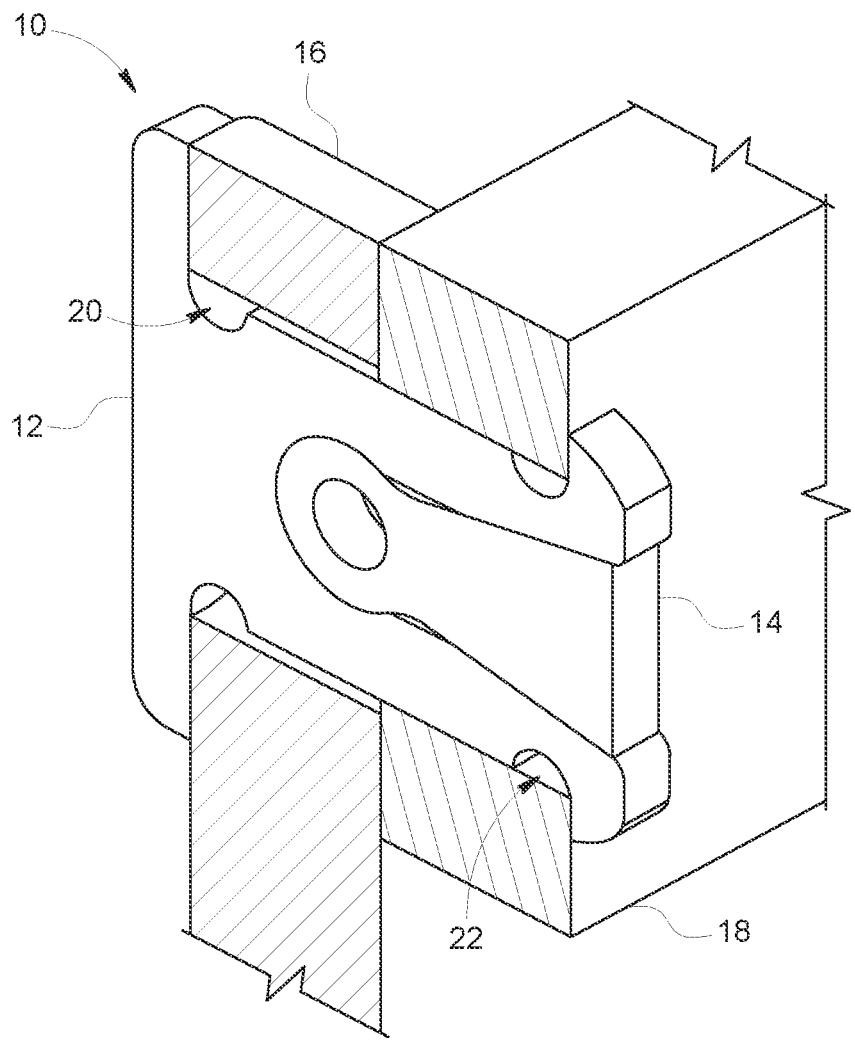
FIG. 1 is a perspective view of a portion of an apparatus that includes a clamp coupling two members together, according to one aspect of the present invention.

As shown in FIGS. 1-7, an exemplary clamp 10 includes a female component in the form of a lock 12 and a male component in the form of a key 14 for insertion into the lock 12. The lock 12 and the key 14 are configured to releasably couple two or more members, such as a first member 16 and a second member 18, together in abutting contact. The lock 12 is inserted through respective slots 20 and 22 of the first and second members 16 and 18 to cause temporary clamping of the first and second members 16 and 18 together. The key 14 is then inserted into the lock 12 (as depicted in FIG. 1) to exert a spreading force on the lock 12 to more permanently resist against the lock 12 being removed from the slots 20 and 22. In one embodiment, once the key 14 has been inserted into the lock 12, the lock 12 cannot be removed from the slots 20 and 22 without causing at least partial destruction of the clamp 10.

Figure 3:
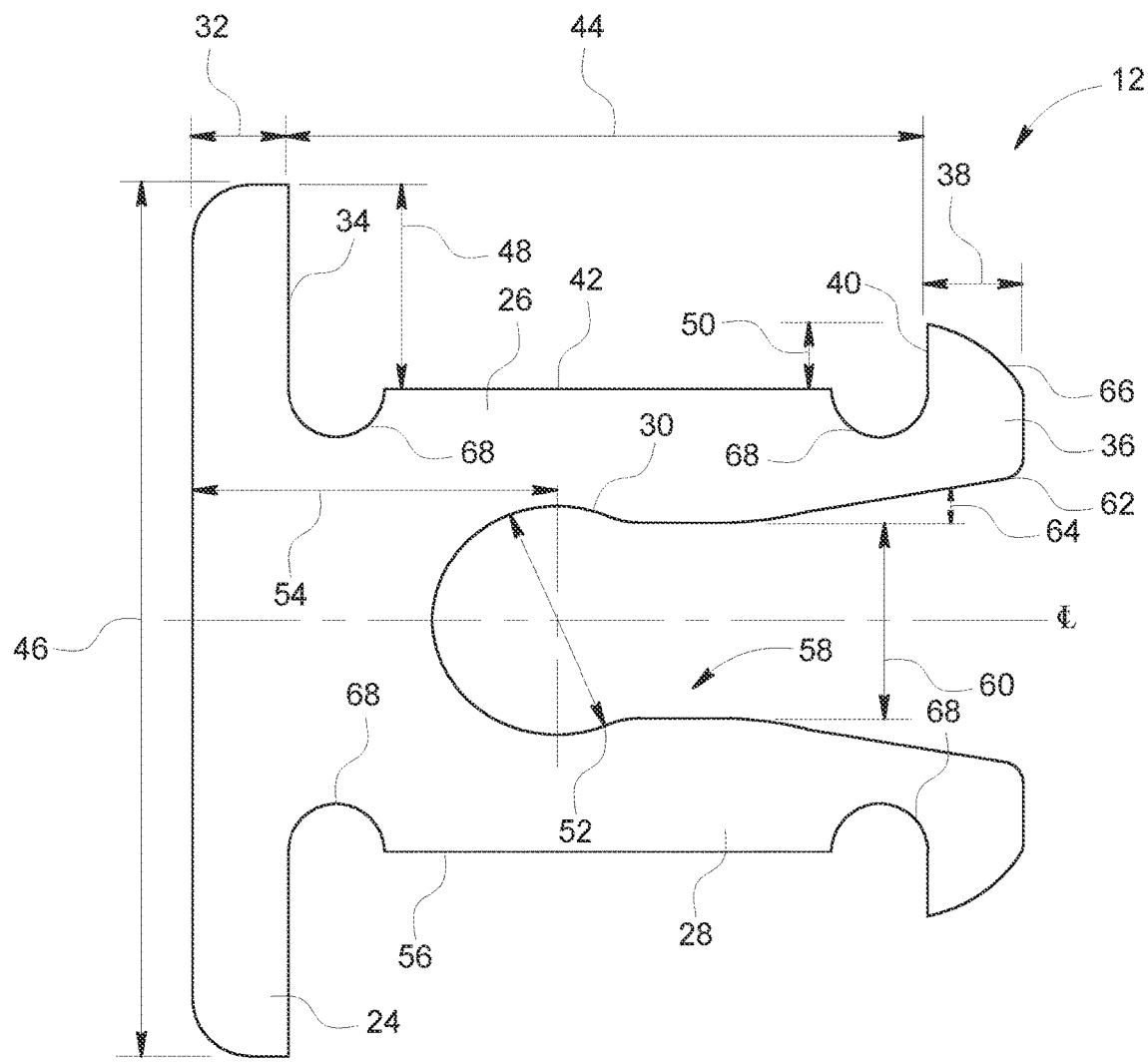
FIG. 3 is a side elevation view of a lock of the clamp illustrated in FIG. 1.
Figure 4:
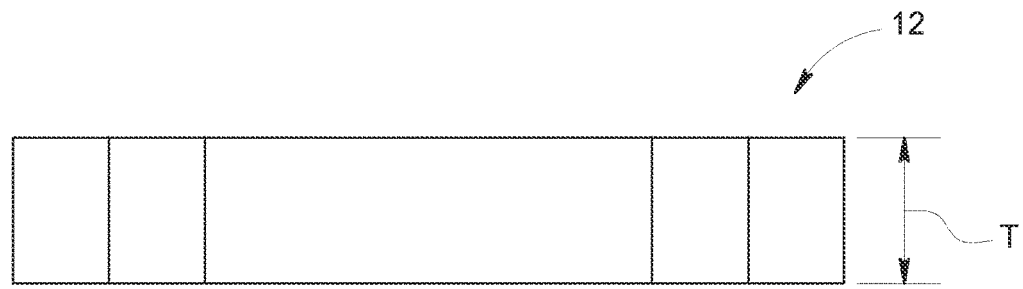
FIG. 4 is a bottom plan view of the lock depicted in FIG. 3.

As shown in FIG. 3, the exemplary lock 12 is substantially symmetrical with respect to a horizontal centerline ₵. Alternatively, it is contemplated that the lock 12 may include features and/or elements that are not symmetrical with respect to each other. As shown in FIG. 4, the exemplary lock 12 has a substantially constant thickness "T." It is noted that, as used herein, the terms top, bottom, front, rear, left, and right are used only for convenience to indicate relative positional relationships as depicted in the drawing figures.

In one embodiment, the exemplary lock 12 is a machined component fabricated from a flexible and resilient material, such as a synthetic polymer having those properties. Accordingly, the features of lock 12 described herein do not have a draft angle associated therewith that is normally required in injection molding processes. The lock 12 may be fabricated, for example, from polypropylene (PP), polyvinylidene difluoride (PVDF), polytetrafluoroethylene (PTFE), perfluoro alkoxy (PFA), polyvinyl chloride (PVC), ethylene chlorotrifluoroethylene (ECTFE), or any other flexible resilient material that enables the lock 12 to function as described herein. Alternatively, it is contemplated that in some embodiments the lock 12 may be fabricated by methods other than machining, such as molding or casting, and therefore may have a draft angle associated with the features described herein.

The lock 12 broadly includes a clamping body portion 24, a first snap lock arm 26, and an opposing symmetrical second snap lock arm 28 that is coplanar with the first snap lock arm 26. The first and second snap lock arms 26 and 28 extend outward from the clamping body portion 24 (integrally joined mounting ends) and define a generally annular-shaped receptacle 30 therebetween adjacent the mounting ends. Each snap lock arm 26 and 28 is elastically flexible about its mounting end. The annular shaped receptacle 30 is centered on the horizontal centerline ₵.

The clamping body portion 24 has an overall height 46 and a width 32. In the example, the width 32 is about one tenth (1/10) of the overall height 46. It is noted, however, that the width 32 may be selected to be any measure that enables the lock 12 to function as described herein. The clamping body portion 24 defines a substantially vertical clamping surface 34, which is configured for face-to-face or other abutting contact with one of the two or more members 16 and 18 (shown in FIGS. 1 and 2).

As noted above, the lock 12 is substantially symmetrical about the horizontal centerline ₵. Accordingly, the features and relative measures of only one of the snap lock arms 26 and 28 will be described herein. As depicted in FIG. 3, the snap lock arm 26 has a distal end portion 36 opposite the clamping body portion 24. The distal end portion 36 has a width 38 that is substantially the same as the width 32 of the clamping body portion 24. It is noted, however, that the width 38 may be selected to be any measure that enables the lock 12 to function as described herein. The distal end portion 36 defines a substantially vertical clamping surface 40, which is configured for face-to-face contact or other abutting contact with the another one of the two or more members 16 and 18 (shown in FIGS. 1 and 2). The snap lock arm 26 also defines a substantially horizontal (longitudinal) clamping surface 42 extending along the snap lock arm 26, which is configured for face-to-face contact with one or more of the respective slots 20 and 22 of the first and second members 16 and 18 (see, e.g., FIG. 1).

In the exemplary embodiment, the vertical clamping surface 34 of the clamping body portion 24 is substantially parallel to the vertical clamping surface 40 of the distal end portion 36. The vertical clamping surfaces 34 and 40 are also substantially perpendicular to the horizontal clamping surface 42. Referring to FIG. 3, the vertical clamping surface 40 is spaced from the vertical clamping surface 34 a distance 44, which is determined based on a total stacked width of the two or more members 16 and 18. In the example embodiment, the distance 44 is in a range between and including about sixty percent (60%) to about seventy percent (70%) of the overall height 46 of the clamping body portion 24. In one preferred embodiment, the overall height 46 is about thirty millimeters (30 mm) plus or minus two tenths of a millimeter (±0.2 mm), and the distance 44 is twenty millimeters (20 mm) plus zero and minus two tenths of a millimeter (+0.0/−0.2 mm). It is noted, however, that the overall height 46 and the distance 44 may be selected to be any measures that enables the lock 12 to function as described herein.

An upper extent of the vertical clamping surface 34 is spaced upward from the horizontal clamping surface 42 a vertical distance 48. In the example embodiment, the vertical distance 48 is in a range between and including about thirty percent (30%) to about forty percent (40%) of the distance 44 between the vertical clamping surfaces 34 and 40. In one preferred embodiment, the vertical distance 48 is about seven millimeters (7 mm) plus or minus two tenths of a millimeter (±0.2 mm). It is noted, however, that the vertical distance 48 may be selected to be any measures that enables the lock 12 to function as described herein.

An upper extent of the vertical clamping surface 40 is spaced upward from the horizontal clamping surface 42 a vertical distance 50. In the example embodiment, the vertical distance 50 is in a range between and including about eight percent (8%) to about fifteen percent (15%) of the distance 44 between the vertical clamping surfaces 34 and 40. In one preferred embodiment, the vertical distance 50 is about two and twenty-five hundredths millimeters (2.25 mm) plus or minus two tenths of a millimeter (±0.2 mm). It is noted, however, that the vertical distance 50 may be selected to be any measure that enables the lock 12 to function as described herein.

In the example embodiment, the annular shaped receptacle 30 has a diameter 52 with its center spaced a distance 54 from a back edge of the clamping body portion 24. The distance 54 is in a range between and including about fifty percent (50%) to about sixty-five percent (65%) of the distance 44 between the vertical clamping surfaces 34 and 40. In one preferred embodiment, the distance 54 is about eleven- and one-half millimeters (11.5 mm) plus or minus two tenths of a millimeter (±0.2 mm). It is noted, however, that the distance 54 may be selected to be any measure that enables the lock 12 to function as described herein. Furthermore, the diameter 52 is in a range between and including about forty-five percent (45%) to about fifty-five percent (55%) of the distance between the horizontal clamping surface 42 of the snap lock arm 26 and a horizontal clamping surface 56 of the snap lock arm 28. In one preferred embodiment, the diameter 52 is about eight millimeters (8 mm) plus two tenths of a millimeter and minus zero millimeters (+0.2/−0.0 mm). It is noted, however, that the diameter 52 may be selected to be any measure that enables the lock 12 to function as described herein.

Figure 5:
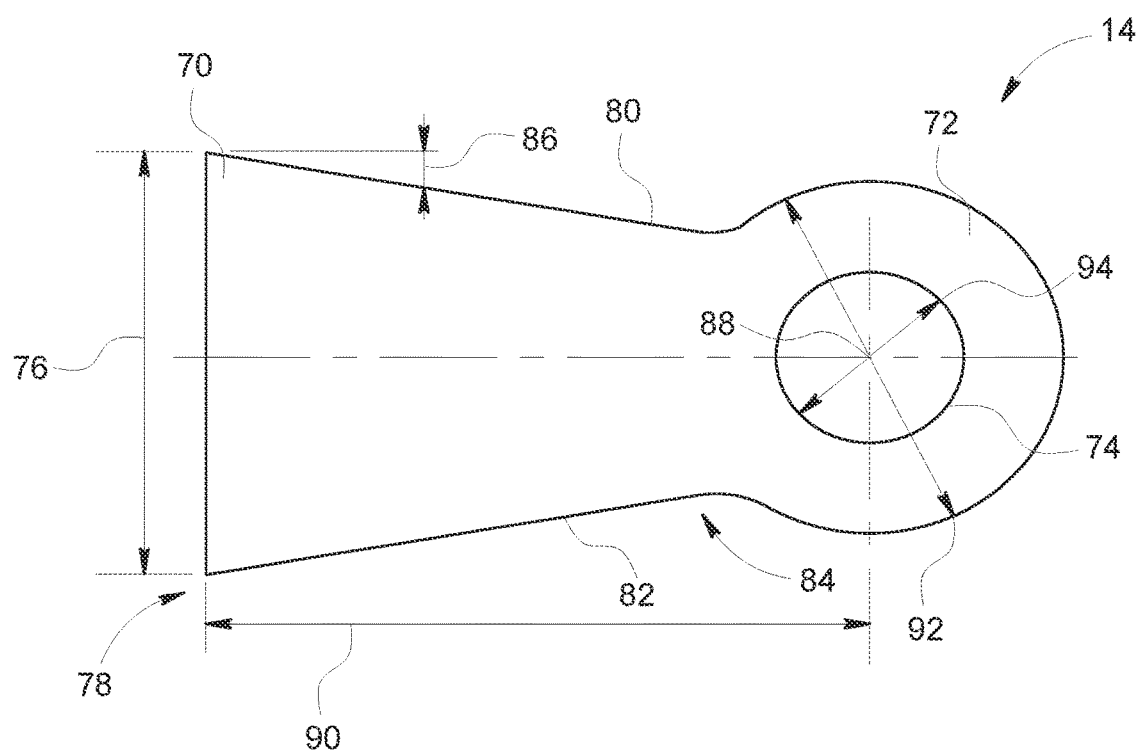
FIG. 5 is a side elevation view of a key of the clamp illustrated in FIG. 1.

The annular shaped receptacle 30 defines a receiver slot 58 for receiving at least a portion of the key 14 (shown, e.g., in FIGS. 1 and 5). The receiver slot 58 is centered on the horizontal centerline ₵. In the example, as described further herein, the receiver slot 58 is cooperatively sized in relation to the key 14 to deform an elastic portion of the key 14 while still allowing the portion of the key 14 to pass therethrough during insertion. In the example, the receiver slot 58 has a width 60 that is in a range between and including about eighty percent (80%) to about ninety percent (90%) of the diameter 52 of the annular shaped receptacle 30. In one preferred embodiment, the width 60 is about six and eight tenths millimeters (6.8 mm) plus or minus one tenth of a millimeter (±0.1 mm). It is noted, however, that the width 60 may be selected to be any measure that enables the lock 12 to function as described herein.

In the exemplary embodiment, the snap lock arm 26 includes an angled surface 62 that extends from the receiver slot 58 to the distal end portion 36 of the snap lock arm 26 at an angle away from the horizontal centerline ₵. The angled surface 62 is configured to receive at least a portion of the key 14 therein for face-to-face contact, and to facilitate deforming an elastic portion of the key 14 as it is inserted into the annular shaped receptacle 30. In the example embodiment, the angled surface 62 is fabricated at an angle 64 that is in a range between and including about eight degrees (8°) to about twelve degrees (12°) relative to the horizontal centerline ₵. In one preferred embodiment, the angle 64 is about ten and two tenths degrees (10.2°). It is noted, however, that the angle 64 may be selected to be any measure that enables the lock 12 to function as described herein.

In the exemplary embodiment, the snap lock arm 26 includes a generally arcuate surface 66 that generally extends from the upper extent of the vertical clamping surface 40 forward to the most distal end of the distal end portion 36. The arcuate surface 66 is configured to engage at least a portion of the respective slots 20 and 22 of the first and second members 16 and 18 (see, e.g., FIG. 1). The arcuate surface 66 facilitates flexing of the snap lock arm 26 downward by an operator applying a squeezing force, thereby permitting the passage of the snap lock arm 26 through the respective slots 20 and 22 when the lock 12 is inserted therethrough. After the distal end portion 36 has passed through the slots 20 and 22, the flexible snap lock arm 26 flexes back to its relaxed or "as-formed" state, whereupon the vertical clamping surfaces 34 and 40 engage respective outer faces of the first and second members 16 and 18.

Figure 2:
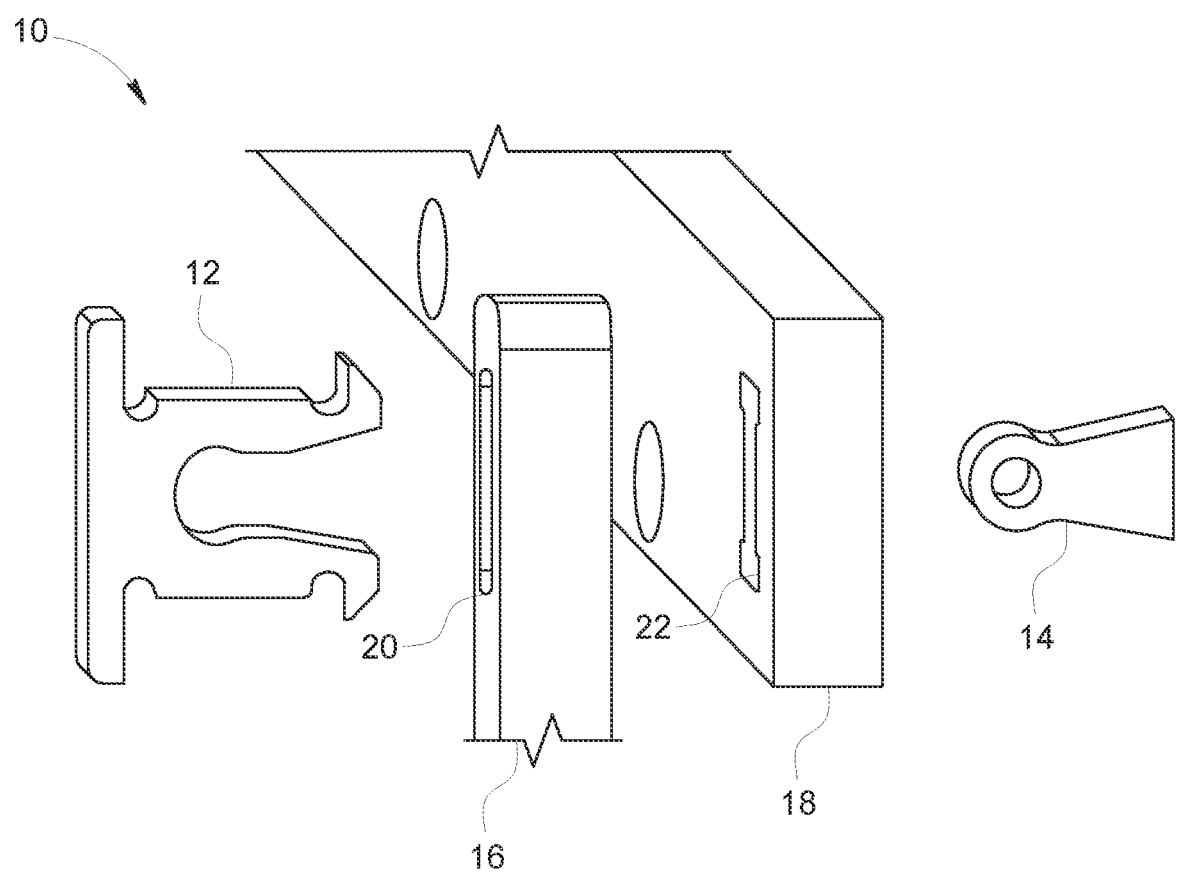
FIG. 2 is an exploded perspective view of the portion of the apparatus depicted in FIG. 1.

As depicted in FIG. 2, the lock 12 includes a plurality of arcuate undercut slots 68. A respective undercut slot 68 is located at the intersection of the vertical clamping surfaces 34 and 40 and the horizontal clamping surface 42, each being formed in the horizontal clamping surface 42. The undercut slots 68 are configured to reduce localized bending stresses in the snap lock arm 26 during insertion of the lock into the slots 20 and 22, because during snap engagement, maximum stress acts at the root of the snap lock arm 26. In addition, the undercut slots 68 avoid interference between the internal square edges and the first and second members 16 and 18 when the lock is in use (see, e.g., FIG. 1). In one preferred embodiment, the undercut slots 68 are semicircular and have a one and one-half millimeter (1.5 mm) radius. It is noted, however, that the radius of the undercut slots 68 may be selected to be any measure that enables the lock 12 to function as described herein.

Figure 6:
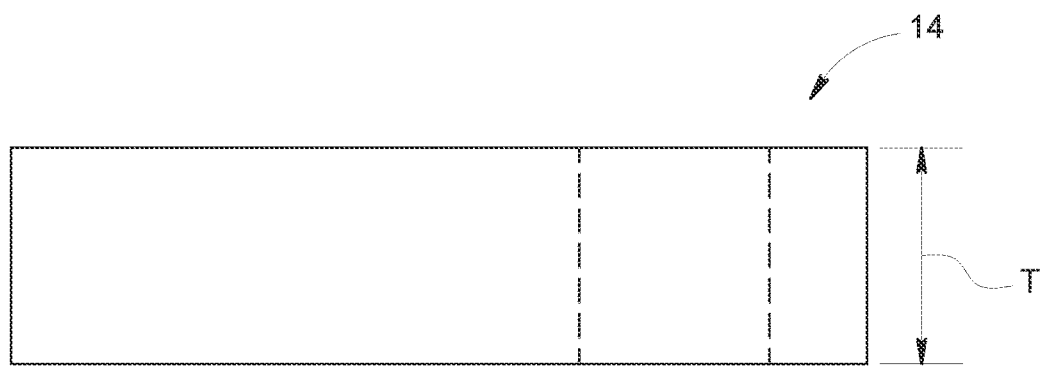
FIG. 6 is a bottom plan view of the key depicted in FIG. 5.

Referring to FIGS. 5 and 6, the exemplary key 14 is substantially symmetrical with respect to a horizontal centerline ₵. Alternatively, it is contemplated that the key 14 may include features and/or elements that are not symmetrical with respect to each other. As shown in FIG. 5, the exemplary key 14 has a substantially constant thickness "T," which is the same as the thickness of the lock 12.

Like the lock 12 discussed above, in one embodiment the exemplary key 14 is a machined component fabricated from a flexible resilient material such as a synthetic polymer. The key 14 may be fabricated from the same materials, such as polypropylene (PP), polyvinylidene difluoride (PVDF), polytetrafluoroethylene (PTFE), perfluoro alkoxy (PF A), polyvinyl chloride (PVC), ethylene chlorotrifluoroethylene (ECTFE), or any other flexible resilient material that enables the key 14 to function as described herein. Alternatively, it is contemplated that in some embodiments the key 14 may be fabricated by methods other than machining, such as molding or casting, and therefore may have a draft angle associated with the features described herein.

The key 14 broadly includes a wedge body portion 70 and a deformable elastic annular head portion 72. The deformable elastic annular head portion 72 is centered on the horizontal centerline ₵, and defines a generally concentric central aperture 74 extending therethrough. The deformable elastic annular head portion 72 is configured to be inserted into the annular shaped receptacle 30 defined between the first and second snap lock arms 26 and 28 of the lock 12 to retain the key 14 within the lock 12, and more particularly, within the annular shaped receptacle 30 of the lock 12.

In the example embodiment, the wedge body portion 70 has an overall height 76 at a first end 78. The wedge body portion 70 includes symmetrical angled surfaces 80 and 82 that angle inward toward each other as they angled surfaces extend away from the first end 78 toward a second end 84 of the wedge body portion 70. The angled surfaces 80 and 82 are configured to engage the angled surfaces 62 of the lock 12 in face-to-face contact as the key 14 is inserted into the annular shaped receptacle 30 of the lock 12. Each angled surface is oriented at an angle 86 relative to the horizontal centerline ₵. In the example embodiment, the angle 86 is in a range between and including about eight degrees (8°) to about twelve degrees (12°) relative to the horizontal centerline ₵. In one preferred embodiment, the angle 86 is about ten degrees (10°). It is noted, however, that the angle 86 may be selected to be any measure that enables the key 14 to function as described herein.

The annular head portion 72 extends from the second end 84 of the wedge body portion 70 and is coplanar with the wedge body portion 70. A center point 88 of the annular head portion 72 is spaced a distance 90 from the first end 78 of the wedge body portion 70. The distance 90 is in a range between and including about twelve millimeters (12 mm) to about sixteen millimeters (16 mm). In one preferred embodiment, the distance 90 is about fourteen millimeters (14 mm) plus or minus two tenths of a millimeter (±0.2 mm). It is noted, however, that the distance 90 may be selected to be any measure that enables the key 14 to function as described herein.

In the exemplary embodiment, the annular head portion 72 has an outer diameter 92 that is sized and shaped to engageably cooperate with the annular shaped receptacle 30 to releasably retain the key 14. In one preferred embodiment, the diameter 92 is about eight millimeters (8 mm) plus or minus one tenth of a millimeter (±0.1 mm). It is noted, however, that the diameter 92 may be selected to be any measure that enables the key 14 to function as described herein.

Based on the diameter measures of the annular shaped receptacle 30 and the annular head portion 72, the key 14 may be coupled to the lock 12 via a light interference fit. As used herein, the phrase "light interference fit" means a value of tightness between the annular head portion 72 and the annular shaped receptacle 30, i.e., an amount of clearance between the components. A negative amount of clearance is commonly referred to as a press fit, where the magnitude of interference determines whether the fit is a light interference fit or interference fit. A small amount of positive clearance is referred to as a loose, slip, or sliding fit.

In the example embodiment, the aperture 74 is defined by a diameter 94. The diameter 94 is in a range between and including about forty-five percent (45%) to about fifty-five percent (55%) of the outer diameter 92 of the annular head portion 72. In one preferred embodiment, the diameter 94 is about four millimeters (4 mm) plus five tenths of a millimeter and minus zero millimeters (+0.5/−0.0 mm). It is noted, however, that the diameter 94 may be selected to be any measure that enables the key 14 to function as described herein.

The aperture 74 allows the elastic annular head portion 72 to be compressed and deformed into an elongated or oval shape during insertion of the key 14 into the lock joint 12. In particular, the flexibility of the material used to fabricate the key 14 provides for deforming the annular head portion 72 to a dimension equal to the width 60 of the receiver slot 58 without overstressing the annular head portion 72. The resiliency of the material enables the annular head portion 72 to flex back to its relaxed or "as-formed" state upon full insertion. After full insertion of the key 14, the angled surfaces 80 and 82 engage the angled surfaces 62 of the snap lock arms 26 and 28 in face-to-face contact to stop the snap lock arms 26 and 28 from flexing, thereby preventing release of the lock 12 from the slots 20 and 22 of the first and second members 16 and 18 (see, e.g., FIG. 1).

Figure 7:
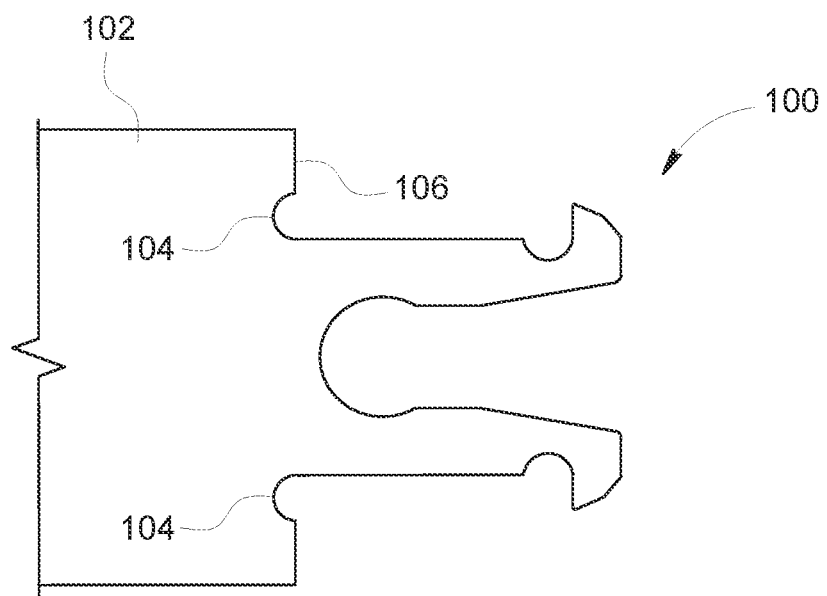
FIG. 7 is side elevation view of an alternative lock of a clamping apparatus, according to another aspect of the present invention.

In an alternative embodiment shown in FIG. 7, a lock 100 is formed similarly to the lock 12 described above. The lock 100, however, may be formed on a structural component of indeterminate size and shapes, such as at the end portion of a beam 102, for example. As such, the clamping body portion 24 of the lock 12 may be replaced by the structure, such as the beam 102. Furthermore, the embodiment depicted in FIG. 7 also shows an alternative arrangement of an undercut slot, depicted by reference character 104. The undercut slot 104 is substantially the same size and shape of the undercut slots 68 shown in FIG. 3. However, in the depicted arrangement, the undercut slot 104 is formed in the vertical clamping surface 106 rather than on the horizontal clamping surface, as depicted in FIG. 3. It is contemplated that the lock 12 and lock structure 100 can include either embodiment of the undercut slots 68 or 104.

Figure 8:
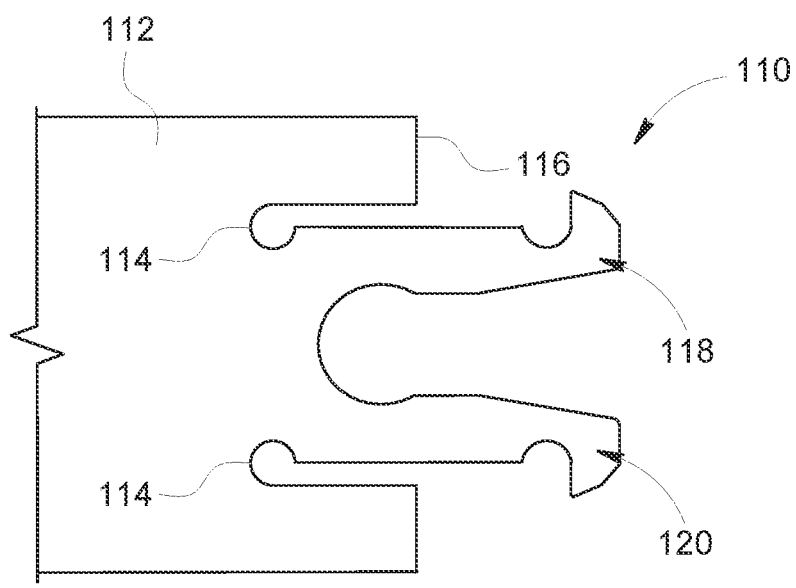
FIG. 8 is side elevation view of yet another alternative lock of a clamping apparatus, according to another aspect of the present invention.

In an alternative embodiment shown in FIG. 8, a lock structure 110 is formed similarly to the lock 12 described above. The lock structure 110, however, may be formed at the end portion of a beam 112 of indeterminate length, for example. As such, the clamping body portion 24 of the lock 12 may be replaced by the beam 112. Furthermore, the embodiment depicted in FIG. 8 also shows an alternative arrangement of an undercut slot, depicted by reference character 114. In this embodiment, the lock structure 110 has a vertical clamping surface 116 that extends outward over the snap lock arms 118 and 120. Such an embodiment enables the lock 110 to clamp the beam 112 to another member (not shown), wherein the stacking thickness is less than that of the two or more members described above. In this instance, the undercut slot 114 extends along the snap lock arms 118 and 120 to approximately the same location as described above with reference to lock 12 and the lock structure 100. As such, the snap lock arms 118 and 120 are substantially the same length as the snap lock arms 26 and 28 described herein, providing substantially the same flexibility as the snap lock arms 26 and 28.

Figure 9:
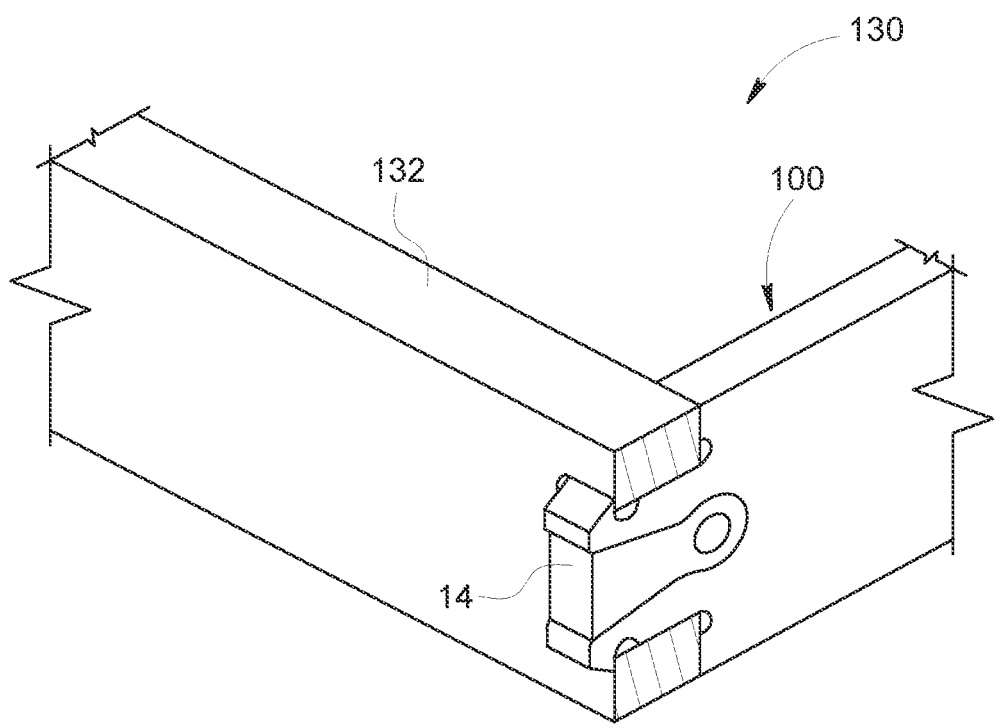
FIG. 9 is a perspective view of a portion of an apparatus that includes the clamp depicted in FIG. 7.

FIG. 9 is a perspective view of a portion of an apparatus 130 that includes the lock structure 100 coupled to another member 132. The lock structure 100 functions substantially the same way as discussed above with respect to the lock 12 and key 14.

FIGS. 10-14 illustrate several potential applications for use of the locks 12, 100, and 110, and the key 14. As noted herein, the illustrated applications are exemplary only and the present invention is not limited to the illustrated applications.

Figure 10:
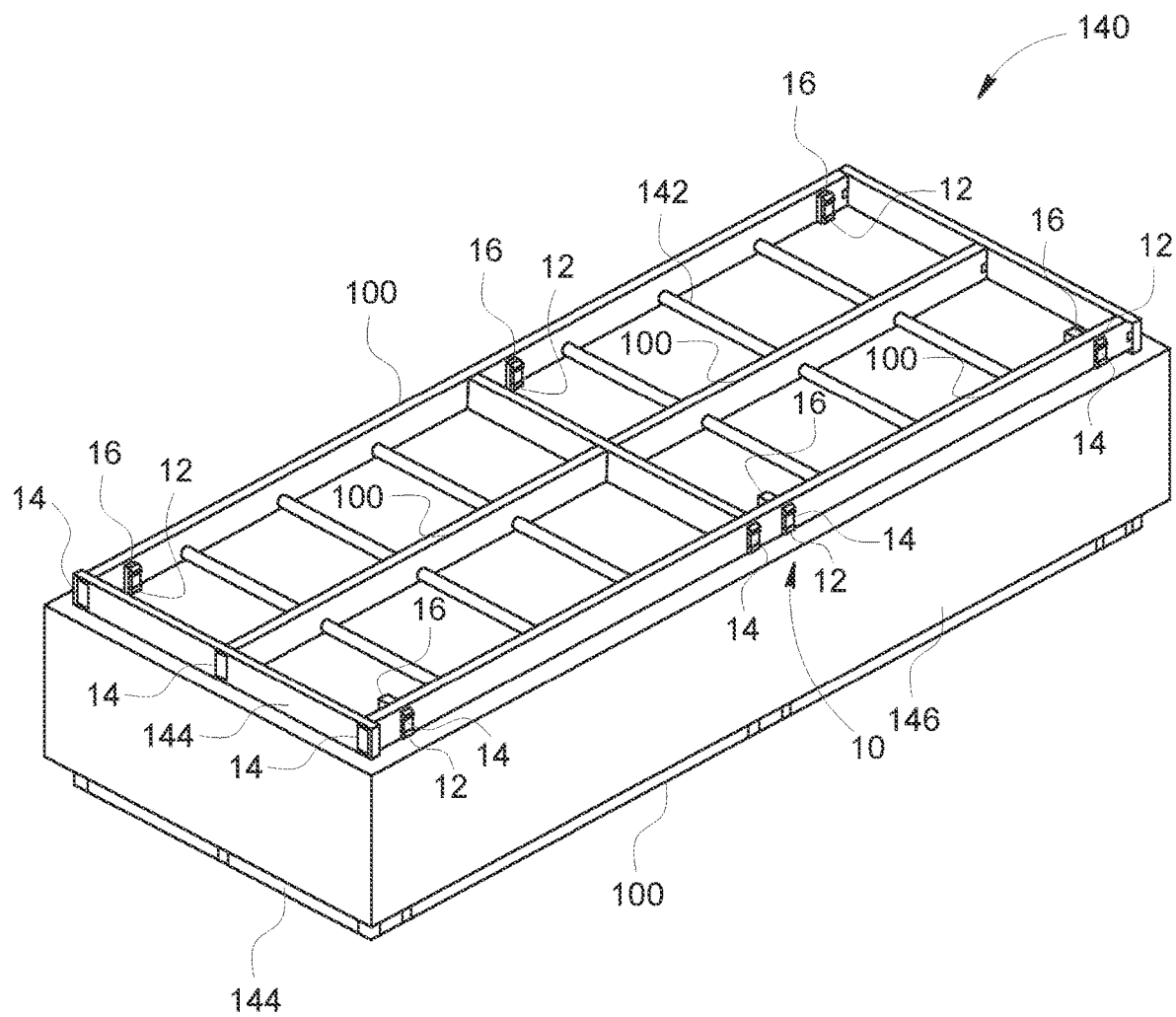
FIG. 10 is a perspective view of a mist eliminator grid for use in a mass transfer column and assembled using clamps of the present invention.

FIG. 10 is a perspective view of a mist eliminator grid 140 used, for example, in a mass transfer column (not shown). In the illustrated application, the mist eliminator grid 140 includes a plurality of components, including, for example, a plurality of locks 12, keys 14, first members 16, lock structures 100, connecting rods 142, and end cross bars 144. In the example embodiment, each of the first members 16 is coupled to one or more lock structures 100 by a lock 12 and key 14 (i.e., a clamp 10). Furthermore, each of the lock structures 100 is also coupled to one or more lock structures 100 and end cross bars 144 via each lock structure's respective lock structure and a key 14. The connecting rods are coupled to the lock structures 100 in a desirable manner, such as by resting in one or more apertures (not shown) formed in the respective lock structures 100. The mist eliminator grid 140 is configured to capture and hold a mist capturing mesh material 146 within the grid structure for use in mass transfer columns to facilitate gas-liquid and liquid-liquid separations, as well as vapor flow conditioning.

Figure 11:
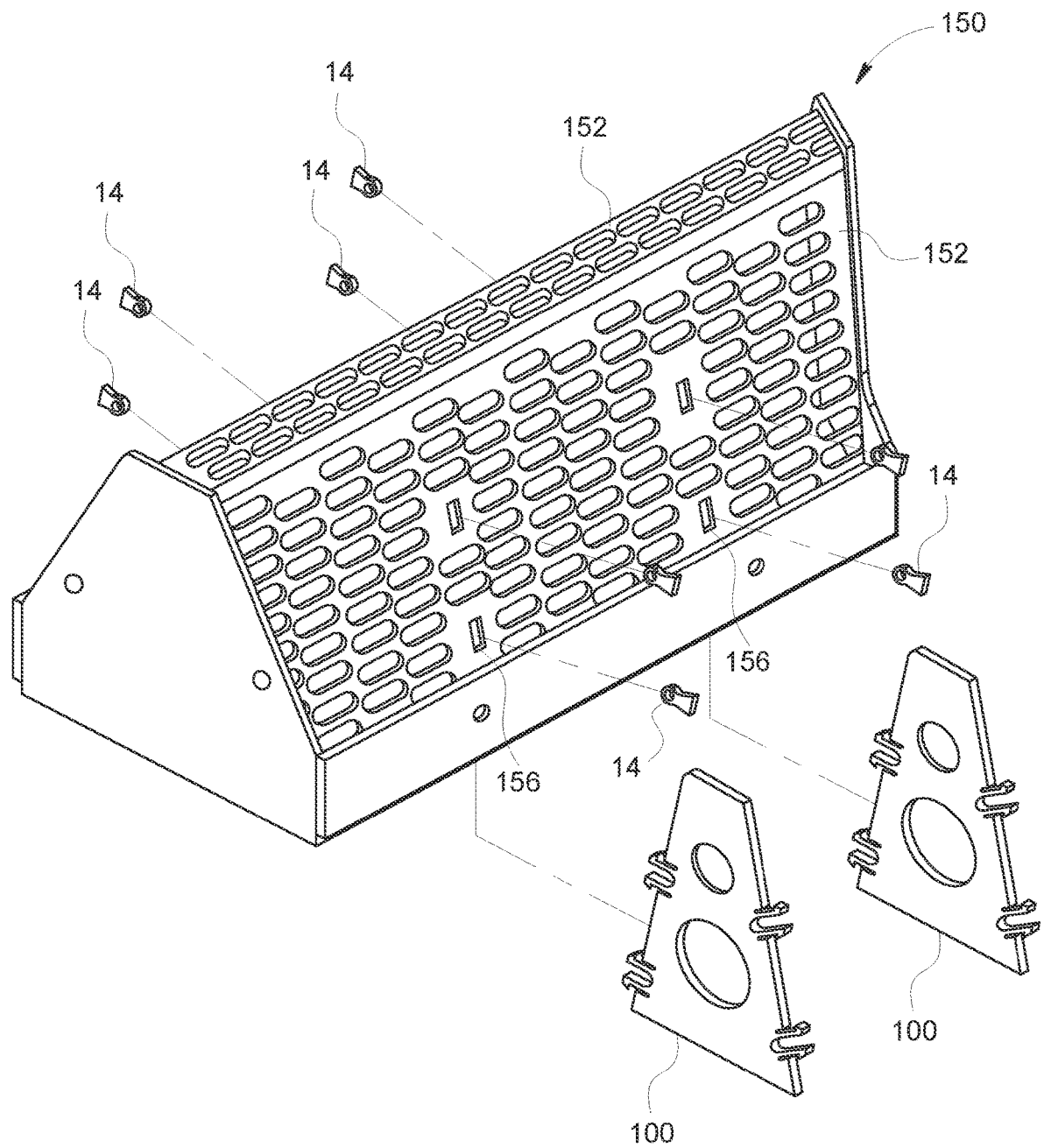
FIG. 11 is an exploded perspective view of a gas injector for use on a random packing gas injection support in a mass transfer column.

FIG. 11 is a perspective view of a gas injector 150 used on a random packing gas injection support in a mass transfer column. In the illustrated application, the gas injector 150 includes a plurality of components, including, for example, a plurality of keys 14, perforated arched gas injector members 152, and lock structures 100. In the example embodiment, each of the lock structures 100 is coupled to one or more gas injector members 152. For example, the lock structure 100 may be formed with one or more lock components as depicted in FIG. 7. Each gas injector member 152 includes one or more slots 156 configured to receive the lock structure therethrough. A key 14 is then secured to the lock structure 100 as described herein to facilitate clamping the gas injector 150 together into a single unit. The gas injector 150 is configured to support a plurality of random packing elements that are used to facilitate mass and/or heat transfer between fluid streams.

Figure 12:
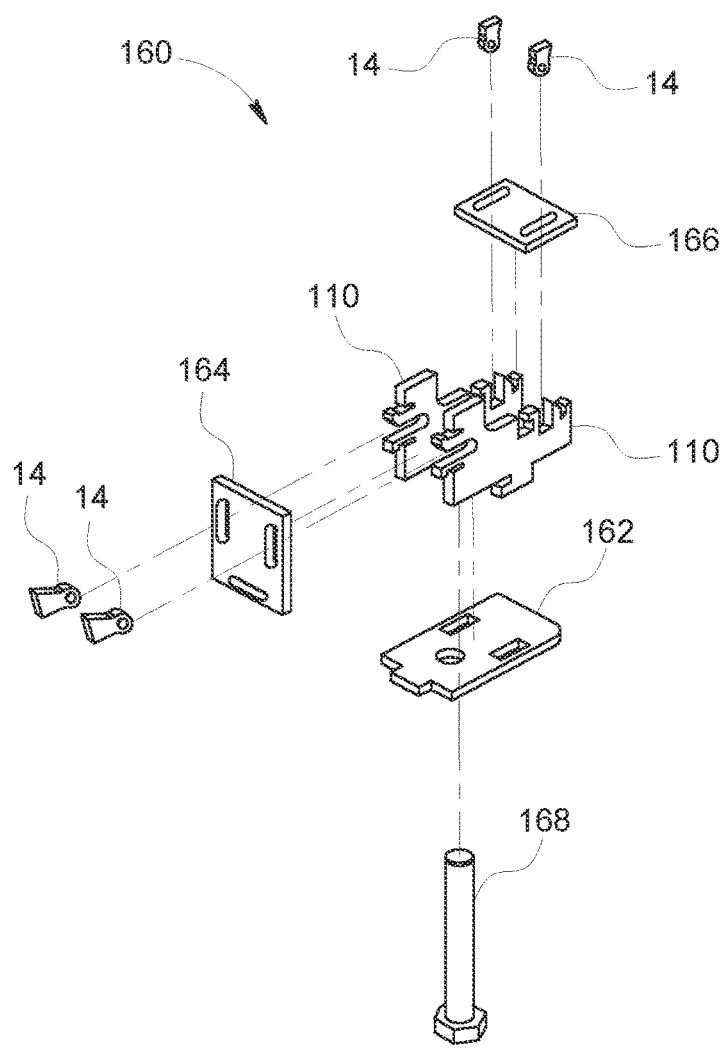
FIG. 12 is an exploded perspective view of a tray clamp assembly used to secure a tray or other mass transfer component to a support ring in a mass transfer column.
Figure 13:
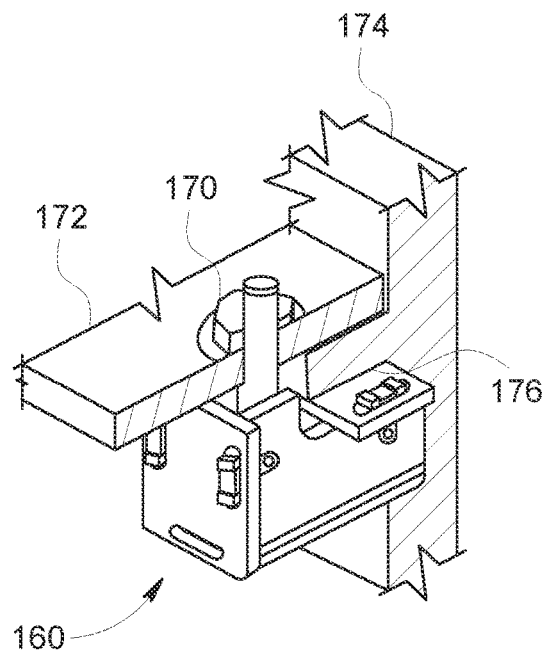
FIG. 13 is a partial section view of a mass transfer column, depicting the tray clamp assembly of FIG. 12 installed and securing a tray in place.

FIG. 12 is an exploded perspective view of a clamp assembly 160 used to secure a tray 172 (see FIG. 13) or other mass transfer component to a mass transfer column 174 (see FIG. 13). FIG. 13 is a partial section view of the mass transfer column 174, depicting the tray clamp assembly 160 installed and securing the tray 172 in place. In the example embodiment, the tray clamp assembly 160 includes a plurality of keys 14, lock structures 110, a bottom plate 162, and end plate 164, and a top plate 166. The clamp assembly 160 also includes a threaded fastener 168 and nut 170, which are used to secure the clamp to the tray 172 and column 174.

The bottom plate 162 is slidably coupled to each of the lock structures 110. The end plate 164 slides over the end of the lock structures 110 and is secured in place using keys 14. Similarly, the top plate 166 slides over the top of the lock structures 110 and is secured in place using keys 14, thereby forming the rigid tray clamp assembly 160.

In use, the tray clamp assembly 160 is positioned such that the top plate 166 bears against an underside surface (not shown) of a support ring 176 of the column 174. The tray 172 is positioned on the ring. The threaded fastener 168 is inserted up through the tray clamp assembly 160 and the tray 172, whereby the nut 170 is tightened to secure the tray to the ring, via the tray clamp assembly 160.

Advantages of the clamp described above include eliminating the need to weld components together to form one or more structures for use in a mass transfer column or other applications. As a result, the components can be fabricated from a plastic material, thereby reducing weight, and therefore stress, on the structures. Furthermore, the clamp facilitates easy assembly of the column structures, thereby reducing installation costs. The clamp therefore reduces costs and increase efficiency of fabrication and installation of structures for use in a mass transfer column.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

In the following specification and claim, reference will be made to several terms, which shall be defined to have the following meanings. The singular forms "a," "an," and "the" include plural references unless the context clearly dictates otherwise.

Approximating language, as used herein throughout the specification and the claims, may e applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value. Here and throughout the specification and claim, range limitations may be combined and/or interchanged. Such ranges are identified and include all the sub-ranges contained therein unless context or language indicates otherwise.

As used herein, directional references, such as, "upper," "lower," "top," "bottom," "front," "back," "side," and similar terms are used herein solely for convenience and should be understood only in relation to each other. For example, a component might in practice be oriented such that faces referred to herein as "top" and "bottom" are in practice sideways, angled, inverted, etc. relative to the chosen frame of reference.

As used herein, the terms "first," "second," and like terms may be used interchangeably to distinguish one component from another and are not intended to signify location or importance of the individual components, unless indicated otherwise.

The terms "coupled," "fixed," "attached to," and the like refer to both direct coupling, fixing, or attaching, as well as indirect coupling, fixing, or attaching through one or more intermediate components or features, unless otherwise specified herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

What is claimed is:

1. A clamp comprising:
a planar lock defining a first longitudinal axis, the planar lock comprising:
a clamping body portion;
a pair of opposing snap lock arms, each snap lock arm having a mounting end integrally joined to the clamping body portion, each snap lock arm being flexible about its mounting end and comprising a longitudinal first clamping surface and a distal end portion opposite the clamping body portion, the distal end portion of each snap lock arm defining a second clamping surface that is substantially perpendicular to the first clamping surface; and
an annular shaped receptacle defined by the pair of opposing snap lock arms, the annular shaped receptacle disposed between the pair of opposing snap lock arms adjacent to the mounting ends thereof; and
a planar key defining a second longitudinal axis, the planar key comprising:
a wedge body portion; and
a deformable elastic annular head portion that extends from an end of the wedge body portion and is coplanar with the wedge body portion to retain the key in the lock after the deformable elastic annular head portion is inserted into the annular shaped receptacle, the elastic annular head portion being sized to engageably cooperate with the annular shaped receptacle to provide the retention,
wherein at least the planar key and the pair of opposing snap lock arms have the same constant thickness.

2. The clamp in accordance with claim 1,
the clamping body portion comprising a third clamping surface, the third clamping surface being parallel to the second clamping surface and perpendicular to the first clamping surfaces,
the lock further comprising an arcuate undercut slot positioned at a root of each snap lock arm and configured to reduce localized bending stresses at the root of each snap lock arm.

3. The clamp in accordance with claim 2,
the distal end portion of each snap lock arm comprising an arcuate surface that generally extends from an upper extent of the second clamping surface forward to a most distal edge of the distal end portion.

4. The clamp in accordance with claim 2,
the annular shaped receptacle having a first diameter in a range between and including about forty-five percent (45%) to about fifty-five percent (55%) of the distance between the longitudinal first clamping surfaces of the pair of opposing snap lock arms.

5. The clamp in accordance with claim 4,
the annular shaped receptacle defining a receiver slot configured to receive the deformable elastic annular head portion therethrough.

6. The clamp in accordance with claim 5,
the receiver slot having a width that is in a range between and including about eighty percent (80%) to about ninety percent (90%) of the first diameter of the annular shaped receptacle.

7. The clamp in accordance with claim 2,
the arcuate undercut slot positioned at the root of each snap lock arm being formed in the longitudinal first clamping surface at an intersection defined between the respective longitudinal first clamping surface and the third clamping surface.

8. The clamp in accordance with claim 2,
the arcuate undercut slot positioned at the root of each snap lock arm being formed in the third clamping surface at an intersection defined between the respective longitudinal first clamping surface and the third clamping surface.

9. The clamp in accordance with claim 2,
additional ones of the arcuate undercut slots being formed in the longitudinal first clamping surface at intersections defined between the respective longitudinal first clamping surfaces and the second clamping surfaces.

10. The clamp in accordance with claim 9,
said annular shaped receptacle defining a receiver slot configured to receive the deformable elastic annular head portion therethrough,
each said snap lock arm comprising an angled surface extending from the receiver slot to the distal end portion at an angle away from each other,
the angle of each angled surface being in a range between and including about eight degrees (8°) to about twelve degrees (12°) relative to the first longitudinal axis.

11. The clamp in accordance with claim 2,
the deformable elastic annular head portion having a second diameter,
the deformable elastic annular head portion defining a concentric aperture therethrough, the aperture having a third diameter,
the third diameter being in a range between and including about forty-five percent (45%) to about fifty-five percent (55%) of the second diameter of the deformable elastic annular head portion.

12. The clamp in accordance with claim 2,
the wedge body portion comprising a first end and symmetrical angled surfaces that extend from the first end inwardly toward each other at a predetermined angle, the symmetrical angled surfaces configured to engage the pair of opposing snap lock arms in face-to-face contact.

13. The clamp in accordance with claim 12,
the predetermined angle of each symmetrical angled surface being in a range between and including about eight degrees (8°) to about twelve degrees (12°) relative to the second longitudinal axis.

14. The clamp in accordance with claim 2, each said snap lock arm comprising a first angled surface, the wedge body portion comprising symmetrical second angled surfaces, the symmetrical second angled surfaces engaging the first angled surface in face-to-face contact.

15. The clamp in accordance with claim 2, wherein the lock and the key are fabricated from a flexible and resilient material.

16. The clamp in accordance with claim 15, wherein the flexible and resilient material comprises a synthetic polymer material.

17. The clamp in accordance with claim 15, wherein the synthetic polymer material comprises one of the following: polypropylene (PP), polyvinylidene difluoride (PVDF), polytetrafluoroethylene (PTFE), perfluoro alkoxy (PFA), polyvinyl chloride (PVC), and ethylene chlorotrifluoroethylene (ECTFE).

18. The clamp in accordance with claim 1,
the clamping body portion comprising a third clamping surface, the third clamping surface being perpendicular to the first clamping surface,
the lock further comprising a plurality of arcuate undercut slots,
a respective one of the plurality of arcuate undercut slots being formed in the third clamping surface at an intersection defined between the longitudinal first clamping surfaces and the third clamping surface.

19. A clamp comprising:
a planar lock defining a first longitudinal axis, the planar lock comprising:
  a clamping body portion;
  a pair of opposing snap lock arms, each snap lock arm having a mounting end integrally joined to the clamping body portion, each snap lock arm being flexible about its mounting end and comprising a longitudinal first clamping surface and a distal end portion opposite the clamping body portion, the distal end portion of each snap lock arm defining a second clamping surface that is substantially perpendicular to the first clamping surface, the clamping body portion comprising a third clamping surface, the third clamping surface being parallel to the second clamping surface and perpendicular to the first clamping surfaces, each snap lock arm further comprising a distal end portion comprising an arcuate surface that generally extends from an upper extent of the second clamping surface forward to a most distal edge of the distal end portion;
  an arcuate undercut slot positioned at a root of each snap lock arm and configured to reduce localized bending stresses at the root of each snap lock arm;
  additional ones of the arcuate undercut slots formed in the longitudinal first clamping surface at an intersection defined between the respective longitudinal first clamping surface and the second clamping surface; and
  an annular shaped receptacle defined by the pair of opposing snap lock arms, the annular shaped receptacle disposed between the pair of opposing snap lock arms adjacent to the mounting ends thereof; and
a planar key defining a second longitudinal axis, the key being made of a synthetic polymeric material and comprising:
  a wedge body portion; and
  a deformable elastic annular head portion that extends from an end of the wedge body portion and is coplanar with the wedge body portion to retain the key in the lock after the deformable elastic annular head portion is inserted into the annular shaped receptacle, the elastic annular head portion being sized to engageably cooperate with the annular shaped receptacle to provide the retention.

20. A clamp comprising:
a planar lock defining a first longitudinal axis, the planar lock comprising:
  a clamping body portion;
  a pair of opposing snap lock arms, each snap lock arm having a mounting end integrally joined to the clamping body portion, each snap lock arm being flexible about its mounting end and comprising a longitudinal first clamping surface and a distal end portion opposite the clamping body portion, the distal end portion of each snap lock arm defining a second clamping surface that is substantially perpendicular to the first clamping surface, the clamping body portion comprising a third clamping surface, the third clamping surface being parallel to the second clamping surface and perpendicular to the first clamping surfaces, each snap lock arm further comprising a distal end portion comprising an arcuate surface that generally extends from an upper extent of the second clamping surface forward to a most distal edge of the distal end portion;
  an arcuate undercut slot positioned at a root of each snap lock arm and configured to reduce localized bending stresses at the root of each snap lock arm;
  additional ones of the arcuate undercut slots formed in the longitudinal first clamping surface at an intersection defined between the respective longitudinal first clamping surface and the second clamping surface; and
  an annular shaped receptacle defined by the pair of opposing snap lock arms, the annular shaped receptacle disposed between the pair of opposing snap lock arms adjacent to the mounting ends thereof; and
a planar key defining a second longitudinal axis, the key being made of a synthetic polymeric material and comprising:
  a wedge body portion; and
  a deformable elastic annular head portion that extends from an end of the wedge body portion and is coplanar with the wedge body portion to retain the key in the lock after the deformable elastic annular head portion is inserted into the annular shaped receptacle, the elastic annular head portion being sized to engageably cooperate with the annular shaped receptacle to provide the retention,
wherein the planar lock is made of a synthetic polymer material.

21. A clamp for joining together a first member and a second member in abutting contact, said clamp comprising:
a planar lock carried by the first member and configured for insertion in a first direction through a slot in the second member, the planar lock defining a first longitudinal center axis and comprising:
  a clamping body portion comprising a clamping surface positioned for abutting against a first face of the second member;
  a pair of opposing snap lock arms, each snap lock arm having a mounting end integrally joined to the clamping body portion and comprising a longitudinal first clamping surface for face-to-face contact with the slot in the second member and a distal end portion positioned opposite from the clamping body portion, the distal end portion of each snap lock arm defining a second clamping surface that extends substantially perpendicular to the first clamping surface and is spaced a distance from the clamping surface of the clamping body portion to allow the second clamping surface to abut against a second face of the second member that is opposite the first face when the clamping surface of the clamping body portion abuts against the first face of the second member, each snap lock arm being flexible about its mounting end to allow the snap lock arms to be flexed inwardly toward the longitudinal center axis during insertion of the planar lock through the slot in the second member and then flexed back outwardly from the longitudinal center axis when the distal end exits the slot to bring the second clamping surface into abutment with the second face of the second member; and an annular shaped receptacle defined by the pair of opposing snap lock arms, the annular shaped receptacle disposed between the pair of opposing snap lock arms adjacent to the mounting ends thereof; and a planar key defining a second longitudinal axis, the planar key comprising:

a wedge body portion; and a deformable elastic annular head portion that extends from an end of the wedge body and is coplanar with the wedge body to retain the key in the lock after the deformable elastic annular head portion is inserted into the annular shaped receptacle from a direction opposite the first direction, the deformable elastic annular head portion being sized to engageably cooperate with the annular shaped receptacle to provide the retention.

22. A clamp for joining together a first member and a second member in abutting contact, said clamp comprising:

a planar lock carried by the first member and configured for insertion in a first direction through a slot in the first member and then through an aligned slot in the abutting second member, the planar lock defining a first longitudinal center axis and comprising:

a clamping body portion comprising a clamping surface positioned for abutting against a face of the first member that is opposite from the second member;

a pair of opposing snap lock arms, each snap lock arm having a mounting end integrally joined to the clamping body portion and comprising a longitudinal first clamping surface for face-to-face contact with the slot in the second member and a distal end portion positioned opposite from the clamping body portion, the distal end portion of each snap lock arm defining a second clamping surface that extends substantially perpendicular to the first clamping surface and is spaced a distance from the clamping surface of the clamping body portion to allow the second clamping surface to abut against a face of the second member that is opposite from the first member when the clamping surface of the clamping body portion abuts against the face of the first member, each snap lock arm being flexible about its mounting end to allow the snap lock arms to be flexed inwardly toward the longitudinal center axis during insertion of the planar lock through the aligned slots in the first and second members and then flexed back outwardly from the longitudinal center axis when the distal end exits the slot in the second member to bring the second clamping surface into abutment with the face of the second member that is opposite from the first member; and an annular shaped receptacle defined by the pair of opposing snap lock arms, the annular shaped receptacle disposed between the pair of opposing snap lock arms adjacent to the mounting ends thereof; and a planar key defining a second longitudinal axis, the planar key comprising:

a wedge body portion; and a deformable elastic annular head portion that extends from an end of the wedge body portion and is coplanar with the wedge body portion to retain the key in the lock after the deformable elastic annular head portion is inserted into the annular shaped receptacle, the elastic annular head portion being sized to engageably cooperate with the annular shaped receptacle to provide the retention.

* * * * *